(12) United States Patent
Kataura et al.

(10) Patent No.: US 8,309,628 B2
(45) Date of Patent: Nov. 13, 2012

(54) HEAT-SETTING INK COMPOSITION FOR OFFSET PRINTING PROCESS

(75) Inventors: Yuichi Kataura, Osaka (JP); Tomohide Katoh, Osaka (JP); Naoki Kodaira, Osaka (JP); Kousuke Naganuma, Osaka (JP)

(73) Assignee: Sakata Inx Corp., Osaka-shi (JP)

( * ) Notice: Subject to any disclaimer, the term of this patent is extended or adjusted under 35 U.S.C. 154(b) by 784 days.

(21) Appl. No.: 11/917,808

(22) PCT Filed: Jun. 16, 2006

(86) PCT No.: PCT/JP2006/312130
§ 371 (c)(1), (2), (4) Date: Jun. 15, 2009

(87) PCT Pub. No.: WO2006/135048
PCT Pub. Date: Dec. 21, 2006

(65) Prior Publication Data
US 2009/0298983 A1 Dec. 3, 2009

(30) Foreign Application Priority Data
Jun. 17, 2005 (JP) ................................ 2005-178370

(51) Int. Cl.
A61L 15/62 (2006.01)
C08K 5/00 (2006.01)
C08K 5/01 (2006.01)
C08K 5/09 (2006.01)
C08K 5/10 (2006.01)
C08K 5/11 (2006.01)
C08L 53/00 (2006.01)
C08L 91/00 (2006.01)
C08G 63/20 (2006.01)
C08G 63/48 (2006.01)
C08G 63/91 (2006.01)
C09D 5/00 (2006.01)
C09D 11/00 (2006.01)
H01B 3/44 (2006.01)

(52) U.S. Cl. .............. 523/160; 106/31.13; 106/31.3; 106/31.34; 106/31.6; 106/31.62; 106/31.66; 523/161; 524/284; 524/306; 524/311; 524/312; 524/313; 524/474; 524/476; 525/7

(58) Field of Classification Search .............. 523/160, 523/161; 106/31.13, 31.3, 31.34, 31.6, 31.62, 106/31.66; 525/7; 524/284, 306, 311, 312, 524/313, 474, 476
See application file for complete search history.

(56) References Cited

U.S. PATENT DOCUMENTS
2,778,806 A * 1/1957 Hutchinson .................. 524/313
2002/0124770 A1 9/2002 Hayashi FOREIGN PATENT DOCUMENTS
JP 2001-342391 A 12/2001
JP 2002-201396 A 7/2002
JP 2003-206429 A 7/2003

OTHER PUBLICATIONS
Chinese Office Action dated Nov. 27, 2009, issued in corresponding Chinese Patent Application No. 200680019669.9.
International Search Report of PCT/JP2006/312130, date of mailing Sep. 12, 2006.

* cited by examiner

*Primary Examiner* — Patrick Niland
(74) *Attorney, Agent, or Firm* — Westerman, Hattori, Daniels & Adrian, LLP

(57) ABSTRACT

The object of the present invention is to provide an ink composition for heatset offset printing which has an excellent drying property, does not cause skinning during storage of ink composition, and has excellent stability on press in printing. The present invention is an ink composition for heatset offset printing containing a pigment, a binder resin, a petroleum solvent, and at least one kind of vegetable oil component selected from the group consisting of a vegetable oil and a fatty acid ester thereof, the content of the vegetable oil component being 20% by mass or less, and the ink composition further containing: 0.008 to 0.7% by mass of a metal soap drier based on the mass of the metal contained in the drier; 0.008 to 12% by mass of at least one kind selected from the group consisting of a polyvalent carboxylic acid, a derivative thereof, tocopherol, and tocotrienol; and 0.08 to 12% by mass of a phenolic antioxidant.

9 Claims, No Drawings

HEAT-SETTING INK COMPOSITION FOR OFFSET PRINTING PROCESS

TECHNICAL FIELD

The present invention relates to an ink composition for heatset offset printing having an excellent drying property, and further relates to an ink composition for heatset offset printing which is capable of being dried at a temperature lower than that for the conventional ink, does not cause skinning during storage, and does not lower printability.

BACKGROUND ART

A conventionally used ink composition for heatset offset printing is comprised of a coloring agent, a binder resin, a vegetable oil such as a drying oil, a low-boiling petroleum solvent and the like. Ink of this type is used in a form of printing in which the ink is heated after printing and dried by evaporating the low-boiling petroleum solvent in the ink (heatset web offset printing). The drying system in heatset web offset printing has established a printing system having an extremely high productivity, normally by heating a paper face using a drying device (there exist methods such as a hot-air blowing type, a direct-heat burner type, a combination of these types, and the like) adjacent to a printing machine until the paper-face temperature becomes 100° C. or higher, forcibly evaporating the low-boiling petroleum solvent, and fixing the binder resin, the coloring agent and the like onto the print media (generally, paper).

However, raising the paper-face temperature to 100° C. or higher as described above causes problems such as wrinkles being generated on paper and high energy costs being required; to prevent these problems, there is a demand for printing at a paper-face drying temperature as low as possible. Further, in recent years, printing speed has been increased in order to improve printing efficiency, whereby the time period for printed materials to pass through the drying device has been shortened. Therefore, an ink composition for heatset offset printing capable of being dried with addition of a lower heat energy is demanded to obtain excellent printed materials under such printing conditions.

Conventionally, the content of a solvent having a low boiling point has been increased as a method for improving the drying property of the ink composition for heatset offset printing. However, the increased content of a solvent having a low boiling point has caused a problem such as lowering stability on press of the ink, thereby having limited improvement of the drying property.

Furthermore, as a method in which a form of drying other than evaporation is used, a method is known in which a drier such as metal soaps that improve the drying property of ink by oxidative polymerization, and an antioxidant such as butylated hydroxytoluene (BHT) for preventing skinning during storage of ink are used together. However, improving the drying property of ink by using this method produces more effects from the drier than those from the antioxidant, whereby occurrence of skinning is unavoidable; then, using the antioxidant to restrain occurrence of skinning to the conventional level produces more effects from the antioxidant than those from the drier, whereby the desired drying property is not possible to be achieved in this case.

Eventually, the conventionally known methods have not been capable of achieving a balance between a performance of improving the drying property and conflicting performances of maintaining stability on press and restraining skinning. Therefore, obtaining the desired drying property has been difficult without lowering storage stability and printability.

SUMMARY OF THE INVENTION

Accordingly, the object of the present invention is to provide an ink composition for heatset offset printing which has an excellent drying property, does not cause skinning during storage of ink composition, and has excellent stability on press in printing.

As a result of intensive investigations made to accomplish the above object, the present inventors have found that the above object can be attained in the case that an ink composition for heatset offset printing contains respective predetermined amounts of a metal soap drier, a phenolic antioxidant, and at least one kind selected from the group consisting of a polyvalent carboxylic acid, a derivative thereof, tocopherol, and tocotrienol, thereby completing the present invention.

More specifically, the present invention relates to (1) an ink composition for heatset offset printing containing a pigment, a binder resin, a petroleum solvent, and at least one kind of vegetable oil component selected from the group consisting of a vegetable oil and a fatty acid ester of the vegetable oil, the content of the vegetable oil component being 20% by mass or less, and the ink composition further containing: 0.008 to 0.7% by mass of a metal soap drier based on the mass of the metal contained in the drier; 0.008 to 12% by mass of at least one kind selected from the group consisting of a polyvalent carboxylic acid, a derivative of the polyvalent carboxylic acid, tocopherol, and tocotrienol; and 0.08 to 12% by mass of a phenolic antioxidant.

Further, the present invention relates to (2) the ink composition for heatset offset printing described in above paragraph (1), wherein the polyvalent carboxylic acid and the derivative of the polyvalent carboxylic acid are at least one kind selected from the group consisting of: citric acid; ascorbic acid; succinic acid; adipic acid; and derivatives of citric acid, ascorbic acid, succinic acid, and adipic acid.

Hereinafter, the detailed description of the present invention will be given.

DETAILED DESCRIPTION OF THE INVENTION

The ink composition for heatset offset printing of the present invention is used in a printing method having a form of drying in which a solvent is evaporated by heating after printing; moreover, the ink composition for heatset offset printing of the present invention contains respective predetermined amounts of a metal soap drier, a phenolic antioxidant, and at least one kind selected from the group consisting of a polyvalent carboxylic acid, a derivative of the polyvalent carboxylic acid, tocopherol, and tocotrienol, and further contains 20% by mass or less of a vegetable oil component in the ink composition.

Hereinafter, the constituent materials of the ink composition for heatset offset printing of the present invention (it should be noted that "ink composition for heatset offset printing" may be simply described as "ink composition for offset printing" hereinafter) are described.

As the pigments contained in the ink composition for offset printing of the present invention, inorganic or organic pigments being colorless or colored, generally used for offset printing ink, can be used. Specific examples of these include: inorganic pigments such as titanium dioxide, barium sulfate, calcium carbonate, organic bentonite, aerosil, iron oxide, and carbon black; organic pigments such as azo pigment, lake pigment, phthalocyanine pigment, isoindoline pigment, anthraquinone pigment, and quinacridone pigment; and the like. Each of these pigments can be used alone or two or more kinds of these can be used in combination. The proper content of the pigment in the ink composition for offset printing is 5 to 50% by mass.

As the binder resin contained in the ink composition for offset printing of the present invention, binder resins that are generally used for offset printing ink can be used. Specific examples of the binder resin include various kinds of phenolic resins such as a rosin modified phenolic resin and a petroleum resin modified phenolic resin, a petroleum resin, various kinds of alkyd resins, a rosin ester resin, a polyester resin, a drying oil modified resin of these compounds, and the like. Each of these compounds can be used alone or two or more kinds of these can be used in combination.

The proper content of the binder resin in the ink composition for offset printing is 10 to 40% by mass.

A proper content (about 15% by mass or less with respect to the binder resin) of a gelling agent can be added to the binder resin as needed to crosslink the resin. In such a case, examples of the gelling agent to be used include aluminum alcoholates, aluminum chelate compounds and the like, and as preferable specific examples, aluminum triisopropoxide, mono-sec-butoxy aluminum diisopropoxide, aluminum tri-sec-butoxide, ethyl acetoacetate aluminum diisopropoxide, aluminum tris-ethyl acetoacetate and the like can be exemplified.

As the petroleum solvent contained in the ink composition for offset printing of the present invention, solvents can be preferably used which are not compatible with water used as a solvent for offset printing, and have a boiling point of 160° C. or higher, preferably a boiling point of 200° C. or higher. Specific examples of the solvent include: petroleum solvents such as a n-paraffinic solvent, an isoparaffinic solvent, a naphthenic solvent, an aromatic solvent, and an a-olefinic solvent; and mineral oils such as a light oil, a spindle oil, a machine oil, a cylinder oil, a turpentine oil, and mineral spirits. Although each of these solvents can be used alone or two or more kinds of these can be used in combination, non-aromatic solvents are preferably used considering the environmental issues and the like in recent years.

The content of the petroleum solvent in the ink composition for offset printing is 20% by mass or more, and preferably 40 to 53% by mass.

As the vegetable oil component contained in the ink composition for offset printing of the present invention, at least one or more kinds selected from vegetable oils and fatty acid esters of the vegetable oil that are generally used for offset printing ink can be used. Specific examples of these include vegetable oils such as a linseed oil, a tung oil, and a soybean oil; fatty acid esters of these oils; and the like.

The content of the vegetable oil component in the ink composition for offset printing is 20% by mass or less, preferably 7 to 15% by mass, and more preferably 7 to 10% by mass.

It should be noted that the total content of the petroleum solvent and the vegetable oil component used in the ink composition for offset printing is to be 30 to 60% by mass.

As the metal soap drier contained in the ink composition for offset printing of the present invention, substances conventionally used for ink for offset printing can be used, and examples thereof include metal salts or rare earth metal salts of octylic acid, naphthenic acid, resin acid, toll oil fatty acid, soybean oil fatty acid, higher hydroxy fatty acid, and the like. Above metal includes cobalt, manganese, lead, zinc, copper, iron, calcium, zirconium, aluminum, and the like. In addition, above rare earth metal includes cerium and the like. Specific examples of the metal soap drier include manganese octylate, cobalt octylate, zirconium octylate, calcium octylate, iron octylate, copper octylate, manganese naphthenate, cobalt naphthenate, zirconium naphthenate, calcium naphthenate, iron naphthenate, copper naphthenate, and the like. Each of these compounds can be used alone, or two or more kinds of these can be used in combination.

The content of the metal soap drier in the ink composition for offset printing, based on the mass of the metal contained in the drier, is 0.008 to 0.7% by mass.

The drier is generally added in a form of metal-soap solution, and "based on the mass of the metal contained in the drier" means that the content is based on the mass converted into the mass of only the metal component in the drier, that is, the mass calculated by multiplying the mass of the solid component in the metal soap drier by the mass ratio of the metal in the drier molecules. For example, in the case that 2 g of 10% solution of manganese octylate [$Mn(C_7H_{15}COOMn)_2$, molecular weight 341, Mn=55] is contained in 100 g of an ink, "the content of the drier based on the weight of the metal" is $(2\times 0.1\times 55/341)/100\times 100 \approx 0.032$ (% by mass).

In the case that the above-mentioned content is less than 0.008% by mass, drying becomes insufficient under the condition in which a paper-face temperature is lower than 100° C.; in the case that the content is more than 0.7% by mass, skinning occurs on the ink composition for offset printing during storage. The content is preferably 0.01 to 0.5% by mass.

Examples of the polyvalent carboxylic acid, a derivative thereof, tocopherol, and tocotrienol contained in the ink composition for offset printing of the present invention include: citric acid, ascorbic acid, succinic acid, adipic acid, citrate, ascorbate, succinate, adipate, ascorbyl palmitate, ascorbyl dipalmitate and the like as the polyvalent carboxylic acid and a derivative thereof; a-tocopherol, b-tocopherol, g-tocopherol, and d-tocopherol as tocopherol; a-tocotrienol, b-tocotrienol, g-tocotrienol, and d-tocotrienol as tocotrienol. Each of these compounds can be used alone, or two or more kinds of these can be used in combination. Examples of the polyvalent carboxylate include sodium ascorbate, sodium citrate, sodium succinate, and the like.

The total content of the polyvalent carboxylic acid, the derivative thereof, tocopherol, and tocotrienol in the ink composition for offset printing is 0.008 to 12% by mass. In the case that the above-mentioned content is less than 0.008% by mass, skinning occurs on the ink composition for offset printing during storage; in the case that the content is more than 12% by mass, drying becomes insufficient under the condition in which a paper-face temperature is lower than 100° C. The content is preferably 0.1 to 3% by mass.

As a phenolic antioxidant contained in the ink composition for offset printing of the present invention, dibutylhydroxytoluene (BHT), butylhydroxyanisole (BHA), hydroquinone (HQ), t-butylhydroquinone (TBHQ), methylhydroquinone, and the like can be used. Each of these compounds can be used alone, or two or more kinds of these can be used in combination.

The content of the phenolic antioxidant in the ink composition for offset printing is 0.08 to 12% by mass. In the case that the above-mentioned content is less than 0.08% by mass, skinning may occur on the ink composition for offset printing during storage; in the case that the content is more than 12% by mass, drying may be insufficient under the condition in which a paper-face temperature is lower than 100° C. The content is preferably 1 to 3% by mass.

According to need, additives such as a pigment dispersant, an anti scumming aid, a friction-resistance improver, an anti-offset agent, a nonionic surfactant, and the like can be used in the ink composition for offset printing of the present invention.

Next, the following description will discuss a method for preparing an ink composition for offset printing containing the above-mentioned constituent materials.

The conventionally known methods (a dry grinding method, a flushing method, and the like) can be used for preparing an ink composition for offset printing of the present invention.

For example, (1) an oil-based varnish for printing ink is prepared in advance by heating a binder resin and at least one of a vegetable oil component and a petroleum solvent, and further as needed a gelling agent. Next, a dried pigment, and as needed a vegetable oil component, a petroleum solvent, and a pigment dispersant are added to the oil-based varnish for printing ink, and then the resulting composition is ink-milled and dispersed with a bead mill, a three-roll mill, and the like; consequently a oil-based base for printing ink is obtained. Furthermore, a metal soap drier, a phenolic antioxidant, and at least one kind selected from the group consisting of a polyvalent carboxylic acid, a derivative thereof, tocopherol, and tocotrienol, are added to the oil-based base for printing ink, and further as needed an oil-based varnish for printing ink, a vegetable oil component, a petroleum solvent, and an additive are added, to adjust to a predetermined viscosity. (2) An oil-based varnish for printing ink is prepared in advance by heating a binder resin and at least one of a vegetable oil component and a petroleum solvent, and further as needed a gelling agent. The oil-based varnish for printing ink is added to a water suspension of the pigment (a water suspension formed by adding water to a water-containing cake and a dried pigment) and then flushed by a flusher (a kneader), a stirring device having a mechanism of desolvation, or the like, thereby dehydrated until the water content in the flushed composition becomes preferably 2% by mass or less. Next, the oil-based varnish for printing ink and the like is added to the dehydrated composition as needed, and then the resulting composition is ink-milled and dispersed with a bead mill, a three roll mill, and the like; consequently a oil-based base for printing ink is obtained. Furthermore, a metal soap drier, a phenolic antioxidant, and at least one kind selected from the group consisting of a polyvalent carboxylic acid, a derivative thereof, tocopherol, and tocotrienol, are added to the oil-based base for printing ink, and further as needed, an oil-based varnish for printing ink, a vegetable oil component, a petroleum solvent, and an additive are added to adjust to a predetermined viscosity.

The ink composition for offset printing of the present invention obtained by such constituent materials and such a preparing method can prevent skinning during storage, and has favorable stability on press in printing. Printing with a printing machine for heatset web offset printing allows the ink to be dried under the condition in which paper-face temperature becomes lower than 100° C.

BEST MODE FOR CARRYING OUT THE INVENTION

The present invention is further described by use of examples hereinbelow; however the present invention is not limited to these examples. Here, in the following description, "%" means "% by mass" and "parts" means "parts by mass" unless otherwise specified.

Preparation Example 1

<Preparation of Varnish for Ink for Heatset Web Offset Printing>

A rosin modified phenolic resin, a soybean oil, and a petroleum solvent (AF solvent (aroma-free solvent) No. 7, manufactured by NIPPON OIL CORPORATION) were mixed in a four-neck flask provided with a condenser, a thermometer, and a stirring machine so as to have the following compounding ratio, and then heated up to 200° C. and stirred for an hour at that temperature; consequently a varnish for ink for heatset web offset printing was obtained.
(Compounding Ratio)

Rosin modified phenolic resin (KG-2212: manufactured by Arakawa Chemical Industries, Ltd.): 50, soybean oil: 10, petroleum solvent: 40, total 100.

Preparation Example 2

<Preparation of Base Ink Composition for Heatset Web Offset Printing>

Carmine 6B (a pigment manufactured by SUMIKA COLOR CO., LTD.) and the varnish for ink for heatset web offset printing obtained in Preparation Example 1 were mixed so as to have the following compounding ratio, and then kneaded with a bead mill and a three-roll mill in succession. Next, a soybean oil and a petroleum solvent were mixed so as to have the following compounding ratio and then stirred; consequently a base ink composition for heatset web offset printing was obtained.
(Compounding Ratio)

Varnish for ink for heatset web offset printing: 54.6, pigment: 16, soybean oil: 1.5, petroleum solvent: 27.9, total: 100.

Examples 1 to 19

Comparative Examples 1 to 8

<Preparation of Ink Composition for Heatset Web Offset Printing>

A metal soap drier, polyvalent carboxylic acid, a derivative thereof, tocopherol, tocotrienol, and a phenolic antioxidant were mixed with the base ink composition for heatset web offset printing so as to have each compounding % shown in Table 1 in each ink composition for heatset web offset printing to be obtained, and then stirred; consequently ink compositions for heatset web offset printing of Examples 1 to 19 and Comparative Examples 1 to 8 were obtained.

Here, "ascorbic acid derivative" and "ascorbate" in Table 1 are respectively ascorbyl dipalmitate and sodium ascorbate.
<Evaluation test>
[Skinning Test]

10 g of the ink composition for heatset web offset printing of each of Examples 1 to 19 and Comparative Examples 1 to 8 was put in a can (about 3 cm in diameter, about 1 cm in depth) and covered with a lid to store at 100° C. When a skin was generated and the ink composition for heatset web offset printing did not stick to a finger, it was judged that skinning occurred. The numbers of days to skinning were shown in Table 1.

[Drying Temperature]

0.1 cc of the ink composition for heatset web offset printing of each of Examples 1 to 19 and Comparative Examples 1 to 8 was developed on a coated paper with a RI tester (machinery number RI-2, manufactured by Akira Seisakusho Co.), and then allowed to pass through a conveyer type drying apparatus (manufactured by Asahi Kagaku Co., Ltd.) two times. Thereafter, a white paper was put on the ink-developed face of the coated paper, sandwiched between a rubber roller and a metal roller of the RI tester, and pressurized at a predetermined pressure for two minutes. The paper-face temperature at which the white paper was not stained with the ink composition for heatset web offset printing was judged as a drying temperature. Results are shown in Table 1.

TABLE 1

| | | Examples | | | | | | | | | |
|---|---|---|---|---|---|---|---|---|---|---|---|
| | | 1 | 2 | 3 | 4 | 5 | 6 | 7 | 8 | 9 | 10 |
| Metal drier | Manganese octylate (metal content: 6%) | 0.01 | 0.3 | — | — | 0.3 | 0.3 | 0.3 | 0.3 | 0.3 | 0.3 |
| | Manganese naphthenate (metal content: 8%) | — | — | 0.3 | — | — | — | — | — | — | — |
| | Cobalt naphthenate (metal content: 8%) | — | — | — | 0.3 | — | — | — | — | — | — |
| Polyvalent carboxylic acid and the like | Ascorbic acid | 2 | 2 | 2 | 2 | — | — | — | — | — | — |
| | Succinic acid | — | — | — | — | 2 | — | — | — | — | — |
| | Citric acid | — | — | — | — | — | 2 | — | — | — | — |
| | Adipic acid | — | — | — | — | — | — | 2 | — | — | — |
| | Ascorbic acid derivative | — | — | — | — | — | — | — | 1 | — | — |
| | Ascorbate | — | — | — | — | — | — | — | — | 2 | — |
| | Tocopherol | — | — | — | — | — | — | — | — | — | 0.01 |
| Phenolic antioxidant | BHT | 2 | 2 | 2 | 2 | 2 | 2 | 2 | 2 | 2 | 3 |
| | Hydroquinone | — | — | — | — | — | — | — | — | — | — |
| Time to skinning(days) | | 7 | 6 | 6 | 6 | 6 | 6 | 6 | 6 | 6 | 6 |
| Drying temperature(° C.) | | 75 to 80 | 75 to 80 | 75 to 80 | 75 to 80 | 75 to 80 | 75 to 80 | 75 to 80 | 75 to 80 | 75 to 80 | 75 to 80 |

| | | Examples | | | | | | | | |
|---|---|---|---|---|---|---|---|---|---|---|
| | | 11 | 12 | 13 | 14 | 15 | 16 | 17 | 18 | 19 |
| Metal drier | Manganese octylate (metal content: 6%) | 0.3 | 0.3 | 0.3 | 0.3 | 0.5 | 0.3 | 0.3 | 0.3 | 0.3 |
| | Manganese naphthenate (metal content: 8%) | — | — | — | — | — | — | — | — | — |
| | Cobalt naphthenate (metal content: 8%) | — | — | — | — | — | — | — | — | — |
| Polyvalent carboxylic acid and the like | Ascorbic acid | — | — | — | 2 | 2 | 0.01 | 10 | 2 | 2 |
| | Succinic acid | — | — | — | — | — | — | — | — | — |
| | Citric acid | — | — | — | — | — | — | — | — | — |
| | Adipic acid | — | — | — | — | — | — | — | — | — |
| | Ascorbic acid derivative | — | — | — | — | — | — | — | — | — |
| | Ascorbate | — | — | — | — | — | — | — | — | — |
| | Tocopherol | 0.1 | 0.5 | 2 | — | — | — | — | — | — |
| Phenolic antioxidant | BHT | 2 | 2 | 2 | — | 2 | 2 | 2 | 0.1 | 10 |
| | Hydroquinone | — | — | — | 2 | — | — | — | — | — |
| Time to skinning(days) | | 6 | 6 | 7 | 6 | 6 | 6 | 7 | 6 | 8 |
| Drying temperature(° C.) | | 75 to 80 | 75 to 80 | 75 to 80 | 75 to 80 | 75 to 80 | 75 to 80 | 75 to 80 | 75 to 80 | 75 to 80 |

| | | Comparative Examples | | | | | | | |
|---|---|---|---|---|---|---|---|---|---|
| | | 1 | 2 | 3 | 4 | 5 | 6 | 7 | 8 |
| Metal drier | Manganese octylate (metal content: 6%) | 0.005 | 0.75 | 0.3 | 0.3 | 0.3 | 0.3 | — | 0.3 |
| | Manganese naphthenate (metal content: 8%) | — | — | — | — | — | — | — | — |
| | Cobalt naphthenate (metal content: 8%) | — | — | — | — | — | — | — | — |
| Polyvalent carboxylic acid and the like | Ascorbic acid | 2 | 2 | 0.005 | 15 | 2 | 2 | — | — |
| | Succinic acid | — | — | — | — | — | — | — | — |
| | Citric acid | — | — | — | — | — | — | — | — |
| | Adipic acid | — | — | — | — | — | — | — | — |
| | Ascorbic acid derivative | — | — | — | — | — | — | — | — |
| | Ascorbate | — | — | — | — | — | — | — | — |
| | Tocopherol | — | — | — | — | — | — | — | — |
| Phenolic antioxidant | BHT | 2 | 2 | 2 | 2 | 0.05 | 15 | — | 2 |
| | Hydroquinone | — | — | — | — | — | — | — | — |
| Time to skinning(days) | | 6 | 3 | 5 | 8 | 4 | 8 | 6 | 4 |
| Drying temperature(° C.) | | 85 to 90 | 75 to 80 | 75 to 80 | 80 to 85 | 75 to 80 | 85 to 90 | 85 to 90 | 75 to 80 |

INDUSTRIAL APPLICABILITY

The ink composition for offset printing of the present invention obtained by such constituent materials and such a preparing method can prevent skinning during storage, and has favorable stability on press in printing. Printing with a printing machine for heatset type web offset printing allows the ink composition to be dried under the condition in which paper-face temperature is low.

The invention claimed is:

1. An ink composition for heatset offset printing containing a pigment, a binder resin, a petroleum solvent, and at least one kind of vegetable oil component selected from the group consisting of a vegetable oil and a fatty acid ester of a vegetable oil,
said vegetable oil component is present in an amount greater than 0 and up to and including 20% by mass, and
said ink composition further containing: 0.008 to 0.7% by mass of a metal soap drier based on the mass of the metal contained in the drier; 0.008 to 12% by mass of at least one kind selected from the group consisting of a polyvalent carboxylic acid, a salt or ester of a polyvalent carboxylic acid, tocopherol, and tocotrienol; and 0.08 to 12% by mass of a phenolic antioxidant.

2. The ink composition for heatset offset printing according to claim 1,
wherein said polyvalent carboxylic acid and said salt or ester of a polyvalent carboxylic acid are at least one kind selected from the group consisting of: citric acid; ascorbic acid; succinic acid;
adipic acid; and a salt or ester of citric acid, ascorbic acid, succinic acid, and adipic acid.

3. The ink composition for heatset offset printing according to claim 1, wherein the content of the petroleum solvent is 20% by mass or more.

4. The ink composition for heatset offset printing according to claim 1, wherein the content of the petroleum solvent is within the range of 40 to 53% by mass.

5. The ink composition for heatset offset printing according to claim 1, wherein the content of the vegetable oil component is within the range of 7 to 10% by mass.

6. The ink composition for heatset offset printing according to claim 1, wherein the content of the binder resin is within the range of 10 to 40% by mass 7. The ink composition for heatset offset printing according to claim 1, wherein the ink composition for offset printing further comprises a gelling agent.

8. The ink composition for heatset offset printing according to claim 1, wherein the total content of the petroleum solvent and the vegetable oil component is within the range of the range of 30 to 60% by mass.

9. The ink composition for heatset offset printing according to claim 1, wherein
said polyvalent carboxylic acid and said salt or ester of a polyvalent carboxylic acid are at least one kind selected from the group consisting of citric acid, ascorbic acid, succinic acid, adipic acid, citrate, ascorbate, succinate, adipate, ascorbyl palmitate, ascorbyl dipalmitate, sodium ascorbate, sodium citrate, and sodium succinate, and
said tocopherol and tocotrienol are at least one kind selected from the group consisting of a-tocopherol, b-tocopherol, g-tocopherol, and d-tocopherol, a-tocotrienol, b-tocotrienol, g-tocotrienol, and d-tocotrienol.

* * * * *